March 14, 1950 — O. J. POUPITCH — 2,500,377
STUD FASTENED MOLDING CLIP
Filed Feb. 28, 1946 — 2 Sheets-Sheet 1
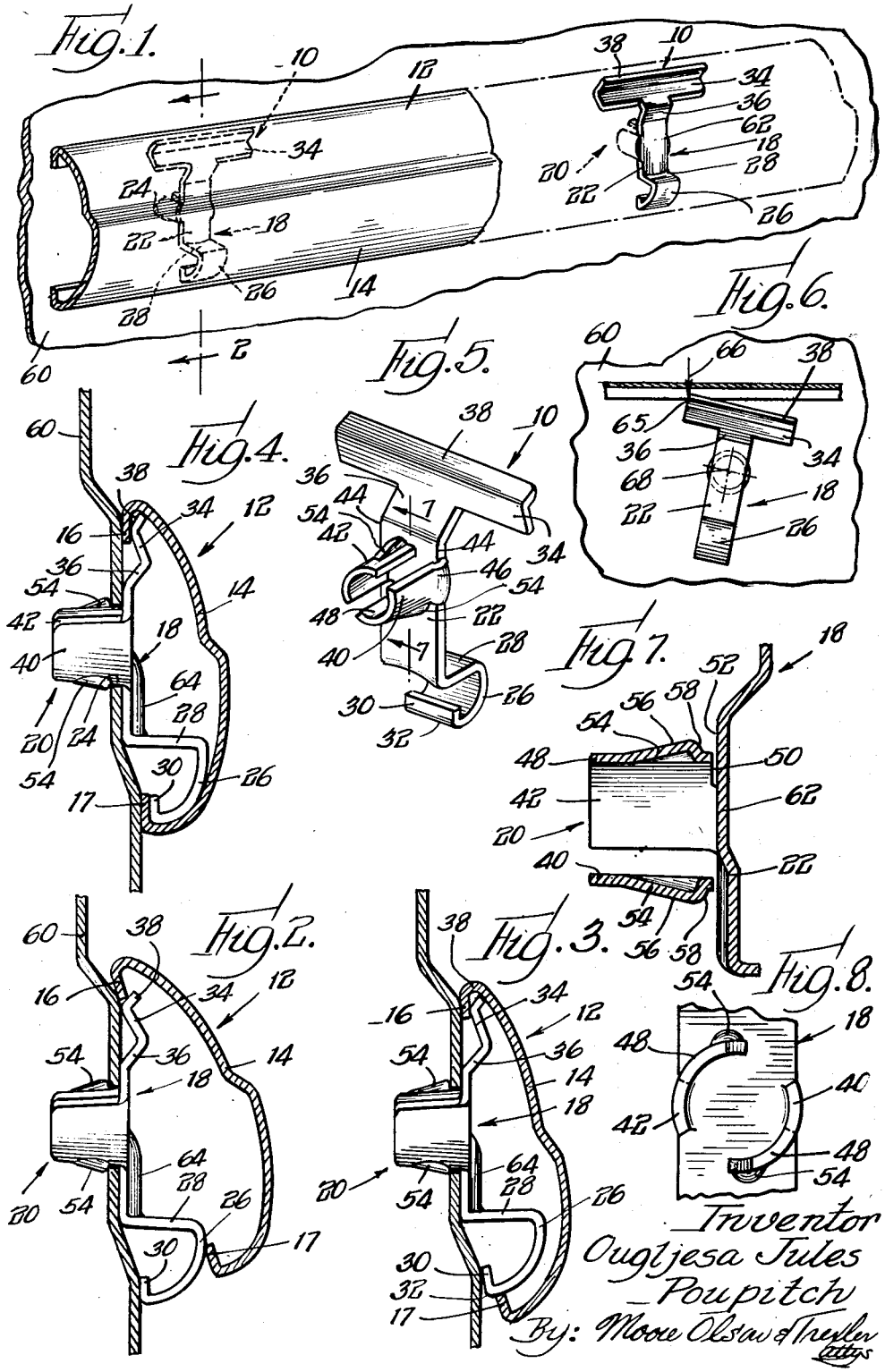
Inventor
Ougljesa Jules Poupitch
By: Moore Olson & Trexler
Attys March 14, 1950  O. J. POUPITCH  2,500,377
STUD FASTENED MOLDING CLIP
Filed Feb. 28, 1946  2 Sheets-Sheet 2
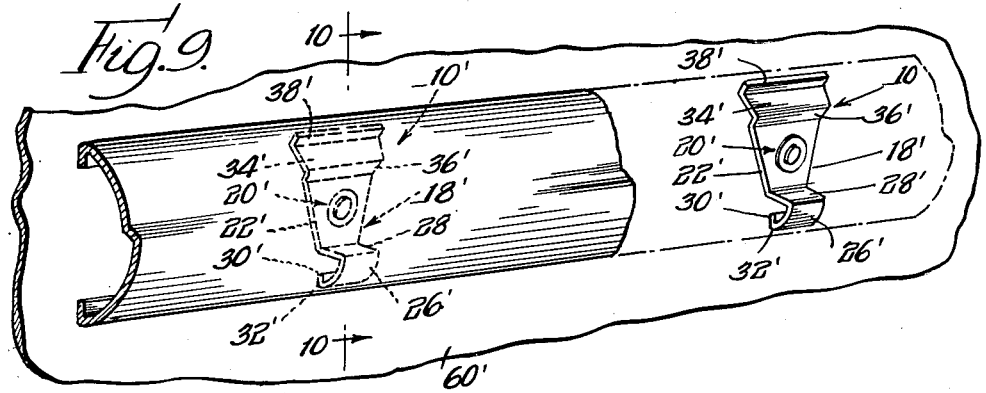
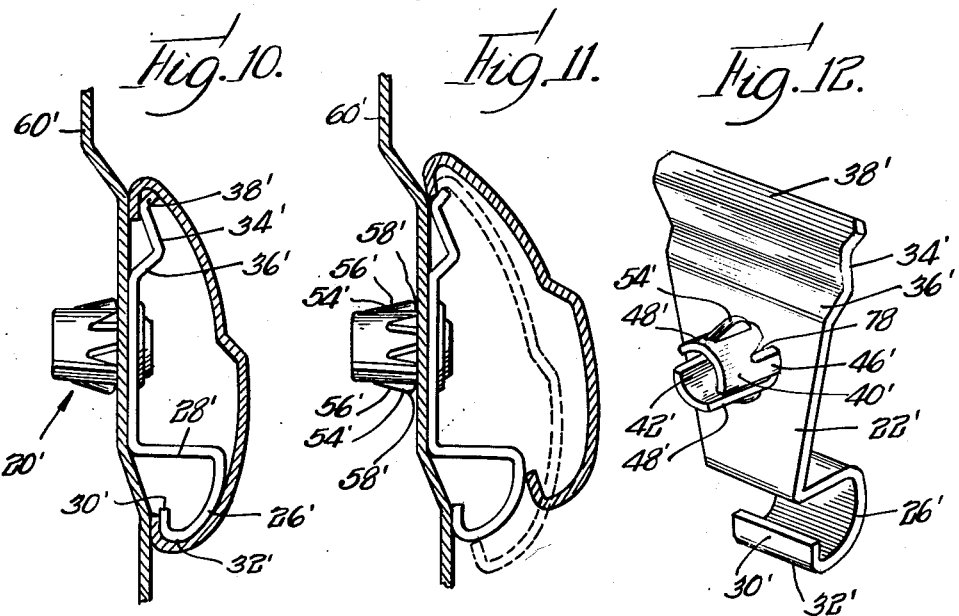
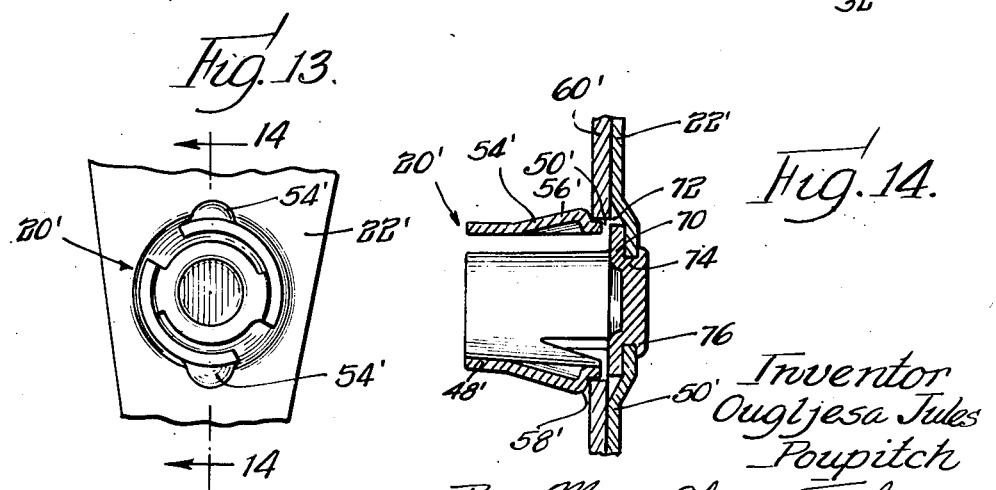
Inventor
Ougljesa Jules Poupitch
By: Moore, Olson & Trexler attys.

Patented Mar. 14, 1950

2,500,377

UNITED STATES PATENT OFFICE 2,500,377

STUD FASTENED MOLDING CLIP

Ougljesa Jules Poupitch, Chicago, Ill., assignor to Illinois Tool Works, Chicago, Ill., a corporation of Illinois Application February 28, 1946, Serial No. 650,853

4 Claims. (Cl. 24—73)

This invention relates generally to snap-in fasteners or clips which are adapted to be snapped into an aperture of a supporting work piece or panel for securing a part, such as a molding strip or the like, to said supporting piece or panel.

The invention contemplates a very simple and inexpensive snap-in type spring finger or clip adapted to be formed, preferably by stamping operations, from sheet metal stock. An important object of the invention is to provide an improved clip of this type in which the molding engaging part or head is so formed that it is substantially non-yielding in a direction transverse of the molding, yet sufficiently resilient in a direction normal to the work supporting piece or panel as to permit the inturned flanges of the molding to snap under the head and be clamped thereby against the work supporting piece or panel.

Another important object of the invention is to provide, in a clip of this type, a molding engaging part or head so fashioned that the molding, on application to the clips, automatically causes the clips properly to align themselves in positions transverse to the molding so that the molding is properly positioned on the work piece or panel.

Further objects of the invention are to provide a one-piece sheet metal clip having a molding engaging part or head which is substantially rigid in a plane transverse to the molding and so fashioned as to cause yielding of the molding as it is applied, thereby utilizing the resiliently yieldable characteristics of the molding; facilitating its application and fastening to the work piece or panel; to provide a novel shank or stud construction relatively yieldable on initial introduction into the aperture in the work piece or part, and yet relatively rigid when brought into final fastening position, firmly to hold the clip to the work piece or panel.

The foregoing and other objects and advantages will be apparent when considered in connection with the accompanying drawings, wherein—

Figure 1 is a perspective view of a molding strip mounted upon a work supporting part or panel by means of fasteners or clips embodying the present invention;

Figures 2, 3 and 4 are enlarged views in vertical section showing the manner of applying or snapping the molding onto the clips;

Figure 5 is a perspective view of the clip per se;

Figure 6 is a fragmentary plan view illustrating the manner in which the interaction of the molding and clip causes alignment of the head of the clip tranverse to the molding;

Figure 7 is an enlarged fragmentary view in vertical section taken substantially along the line 7—7 of Figure 5;

Figure 8 is a fragmentary bottom view of the clip;

Figure 9 is a perspective view similar to Figure 1 but illustrating a modified clip;

Figures 10 and 11 are views in vertical section taken substantially along the line 10—10 of Figure 9 illustrating the manner of applying the clip shown in Figure 9;

Figure 12 is a view in perspective of the modified form of clip;

Figure 13 is a fragmentary bottom view of the clip of Figure 12; and

Figure 14 is a view in vertical section taken along the line 14—14 of Figure 13.

Referring now to the drawings more in detail, wherein like numerals have been employed to designate similar parts throughout the various views, it will be seen that the invention contemplates a spring clip or fastening device, designated generally by the numeral 10, as shown in Figures 1 to 8 inclusive. This clip 10 is particularly designed to be received by a channel-like or hollow, molding strip or member 12.

It will be noted that the molding strip 12 has a curved ornamental body portion 14 and oppositely disposed, inturned marginal flanges 16 and 17. The design and shape of molding strips which are employed vary greatly, dependent upon the ornamental effect which is desired. The form of molding shown in the drawings is for illustrative purposes only, as it will be evident that many different forms, designs and shapes may be secured by the clip 10.

The clip or fastener 10 is preferably made from sheet metal and includes a molding engaging part or head 18 and a resilient locking shank portion or stud 20 extending from and formed integral with the head 18. The head 18 of the fastener 10 is generally of T shape and includes a strap or body portion 22 which is of a width slightly less than the aperture 24 provided in the work piece for reception of the stud 20. One end of the body portion is provided with a nose portion 26 joined to the body portion by an outwardly extending connecting portion 28 which extends substantially at right angles to the body portion 22. The nose portion 26 curves inwardly toward the plane of the body portion 22 from the outer end of the connecting portion, but extends outwardly from the plane of the connecting portion and is well rounded to form a cam surface and terminates in an inturned flange and molding clamping portion 30 connected to the nose portion by a well rounded cam-like edge 32.

The opposite side or end of the body portion is joined to an elongated, molding engaging and clamping portion or foot 34 which is substantially V-shaped in cross-section and connected to the body portion by an outwardly inclined connecting portion 36. The portion 34 has a length which is considerably greater than the width of the body portion 22 and the nose portion 26, for purposes presently to be described.

It will be noted that the outer edge portion 38 of the clamping portion 34 is inclined outwardly to facilitate the application of the molding strip and snapping of the inturned flange 16 under the portion 34.

Attention is now directed to the structure of the resilient locking shank or stud 20. This stud 20 comprises two part-circular arms or legs 40 and 42 formed integrally with the body portion 22, to the opposite edges 44 of which they are joined by integral connecting portions 46 which extend substantially at right angles to the plane of the body portion 22. The part-circular arms 40 and 42 are considerably greater in arcuate width than the connecting portions 46, so that the portions or extensions 48 of the arms 40 and 42 extend under the body portion 22 and are resiliently yieldable toward and from each other in a generally radial direction. These arm extensions 48 are formed relatively adjacent their inner free edges 50, which are spaced from the under surface 52 of the body portion 22, with camming projections or dimples 54 pressed outwardly therefrom. These dimples or pressed-out portions 54 are joined to the arm extensions at both ends and provide camming surfaces 56, which are of substantial length axially of the stud, and sharply inclined latching or locking surfaces 58. Each locking surface, at its point of merging into an arm extension, is spaced from the under surface 52 of the body portion 22 a distance comparable to the thickness of the work piece, part or panel 60, into the aperture 24 of which the stud 20 is adapted to be snapped.

It should further be noted that the stud 20 is tapered slightly from the body portion 22 to its free end, as best seen in Figure 4, to facilitate the ready entry of the stud into the aperture 24.

The stud 20 and that portion 62 of the body portion 22 to which the stud is joined, and under which the arm extensions 48 project, form a plug which, when the stud is in final latching or locking position with respect to the panel 60, as best shown in Figure 4, closes the aperture 24.

It should be noted that by reason of the connecting portions 46, the arms 40 and 42 are substantially rigid adjacent the body portion 22, although the extensions 48 are readily yieldable toward and from each other as the camming surfaces 56 engage the wall of the aperture 24 to permit the dimples 54 to pass through the aperture and the extensions 48 to snap outwardly to their normal untensioned position as the high points of the dimples pass the under surface of the work piece 60. The latching surfaces 58, being sharply inclined, act as cam surfaces against the edge of the aperture to draw the body portion 22 firmly against the surface of the panel 60 and firmly hold the clip to the panel, while making it possible to remove the clips from the panel should it be desired to detach the molding subsequent to its application.

In the process of attaching a molding to the work supporting piece or panel 60, a series of the fastener units or clips 10 are first secured to the panel by snapping the stud 20 of each clip into one of the apertures in the panel so that the body portion 22 abuts the upper surface of the panel, the head portions 18 and the clamping portions 34 contact that panel surface or are spaced therefrom a distance which is less than the thickness of the flanges 16 and 17 of the molding 14. The molding is applied to the series of clips by first inserting the flange 16 under the outturned edges 38 of the clamping portions 34 of the clips which act as a fulcrum, as seen in Figures 2 and 3, and then swinging or pressing the opposite side or flange 17 of the molding toward the work supporting panel 60. This causes the inner edge of the flange 17 to engage the cam-providing surface of the nose portion 26 of each fastener unit.

The reaction or camming effect of the nose portion 26 on the molding causes the molding to move downwardly, with reference to Figures 2, 3, 4 and 6, and the molding to expand or yield laterally. This causes the flange 16 of the molding to snap from the position shown in Figure 2 to the position shown in Figure 3, at which it lies under the clamping portion 34 and its downward movement is limited by the engagement of the side of the molding with the outturned edge 38. Continued swinging or pressing of the molding toward the work supporting panel causes further lateral expansion or yielding of the molding until the flange 17 engages the rounded cam edge 32 which joins the nose portion 26 to the inturned flange 30, and the flange 17, acting on the camming edge 32, causes the nose portion to yield or raise in a direction away from the panel 60 and about the point of connection of the nose portion with the connecting portion 28, so that the flange 17 snaps under the flange 30 of the nose portion of the clip and is clamped thereby against the panel 60.

It should be noted that the connecting portion 28 is substantially rigid and unyielding, and that the fastener unit or clip utilizes the inherent resilience of the molding in causing the molding to snap over the clip (rather than the clip snapping into the molding).

The over-all length of the clip is slightly greater than the inner width of the molding between the opposite sides thereof, measured in the plane of the inner surface of the flanges 16 and 17 in the normal untensioned condition of the molding, so that the resilience of the molding is utilized to hold it against lateral movement or vibration.

In order further to enhance the longitudinal rigidity of the clip, i. e., the rigidity of the clip in a direction laterally of the molding, the body portion 22 may be formed with a longitudinally extending, strengthening rib 64 extending inwardly from the connecting portion 28, as seen best in Figure 4.

If, when the molding is placed over a series of clips and the flange 16 is inserted under the outturned edge 38, a clip is tilted at an angle to the longitudinal edge of the molding, as seen in Figure 6, the swinging or pressing of the opposite side of the molding toward the panel and the engagement of the flange 17 with the nose portion 26 causes a lateral expansion or yielding of the molding and applies a force to the corner 65 of the outturned edge 38, as indicated by the arrow 66. This force 66, therefore, will apply to the corner 65 of the clip a component of force or torque tending to rotate the clip in a counter-clockwise direction about the axis 68 of the stud, thereby automatically causing the stud of the clip to rotate in the aperture 24 of the work supporting panel until it occupies the position shown in Figure 1, in which the longitudinal axis of the clip is normal to the longitudinal axis of the molding and the clamping portion 34 parallel to that longitudinal axis of the molding. This automatic aligning action of the clip considerably reduces the time required for applying the molding, since the clips do not have to be precisely positioned or aligned prior to the snapping of the molding over the clip. This automatic aligning action of the clip also makes unnecessary the use of rectangular or other polygonic studs and work apertures in order to secure proper positioning of the clips to receive the molding, and thus saves the additional expense of special machines or apparatus for forming studs and apertures of such shapes.

In the modified form of fastener unit or clip 10', shown in Figures 9 to 14, the construction is such as to form a more perfect water excluding seal for each aperture in the work supporting piece of panel, and such as to form a more rigid molding engaging or head portion 18'. The head portion 18' comprises, in this form of the invention, a triangular shaped plate having a body portion 22'. The clamping portion 34', which is formed at the base of the triangle, is joined to the body portion 22' by the outturned connecting flange 36' and is provided with the outturned edge portion 38'. The nose portion 26' is joined to the body portion 22' by the connecting portion 28' and is formed with a rounded cam edge 32' and an inturned flange portion 30'.

The stud 20' of this form of fastener is formed separately from the head portion 18' and comprises a sheet metal plug of cylindrical form having a cap portion 70 received in a circular recess 72 formed in the body portion 22' of the head 18'. The cap 70 is formed with a reduced pin portion 74 which passes through an appropriate aperture in the body portion 22' and is peened over or riveted to the body portion 22', as at 76, to fix the stud to the head portion. The part-circular arms 40' and 42' are bent from the cap portion 70, to which they are integrally joined by the connecting portions 46'. The arcuate extensions 48' of the arms 40' and 42' are free from the cap portion 70, from which their edges are spaced by the slots 50', so that these extensions are yieldable toward and from each other to permit introduction of the stud into an aperture in the work piece. These extensions are provided with the pressed-out lugs 54' having the camming surfaces 56' and the cam latching surfaces 58'.

The stud 20' may be slightly tapered toward its outer end, as seen in Figures 10 and 11, to facilitate entry of the stud into the aperture of the work supporting piece. The resiliently yieldable characteristics of the extensions 48' of the stud arms 40' and 42' may be further enhanced by the V-shaped grooves or recesses 78.

As seen in Figures 10 and 11, the molding is secured to these clips, after a series thereof have been secured to the work supporting panel, in the same manner as shown in respect to the form of the invention illustrated in Figures 1 to 8.

It will be further evident that the body portion 22' of the clip 10' completely overlies the aperture in the work supporting panel 60' and, therefore, forms a more perfect water sealing cap for the plug formed by the stud 20'. The self-aligning action of the clip 10' is the same as the self-aligning action of the clip 10 since the clip portion 34' is formed at the base of the triangular plate which forms the head portion of the clip and is elongated in a direction parallel to the longitudinal axis of the molding.

It will be seen from the foregoing that the invention provides a simple and inexpensive snap-in type molding clip or fastener in which the molding engaging part is sufficiently resilient to permit the inturned flanges of a molding to snap under the head of the clip and be clamped thereby to a work supporting piece or panel. It will also be clear that the invention provides, in a clip of this type, a molding engaging part so fashioned that the molding, on application to a series of clips, automatically causes the clips to align themselves in positions transverse to the molding so that the molding is properly positioned on the work supporting panel.

While certain specific embodiments have been disclosed herein, it will be apparent that the invention is by no means limited to the details of construction herein disclosed but is capable of other modifications and changes without departing from the spirit and scope of the appended claims.

The invention is hereby claimed as follows:

1. A fastener for attaching a channel-like work piece with inturned flanges to an apertured support, and comprising a stud including peripherally spaced contractible and expansible shoulder means insertable through the apertured support and engageable with one face thereof when assembled, and a head part having a bridge portion from which said stud projects, said bridge portion extending radially from opposite sides of said stud and spaced axially therefrom to accommodate the work support therebetween and capable of permissive tilting with respect to the central axis of said spaced shoulder means, one margin of said bridge portion presenting a work piece supporting section extending well beyond opposite sides of an axial plane lengthwise bisecting said head part and the other margin of said bridge portion presenting a relatively narrower work piece supporting section, said first mentioned supporting section providing a fulcrum to facilitate swinging a work piece into supported engagement with said narrower supporting section.

2. A fastener as claimed in claim 1, wherein the relatively narrower supporting section is joined to the bridge portion by a portion extending outwardly therefrom in a direction opposite to that of the projecting stud and presenting a camming surface to facilitate flexing thereof and passage of the work piece thereover during assembly.

3. A fastener as claimed in claim 1, wherein the bridge portion includes a flat intermediate portion extending radially of the stud axis and spaced from the shoulder means for engagement with the other face of the support when assembled.

4. A fastener as claimed in claim 1, wherein the stud is integral with the flat portion and is formed by extensions thereof bent at substantially right angles thereto.

OUGLJESA JULES POUPITCH.

REFERENCES CITED

The following references are of record in the file of this patent:

UNITED STATES PATENTS

| Number | Name | Date |
|---|---|---|
| 2,059,049 | Smith | Oct. 27, 1936 |
| 2,092,522 | Post | Sept. 7, 1937 |
| 2,221,124 | Wiley | Nov. 12, 1940 |
| 2,245,375 | Wiley | June 10, 1941 |
| 2,306,460 | Meyer et al. | Dec. 29, 1942 |
| 2,353,455 | Gisondi | July 11, 1944 |
| 2,428,338 | Poupitch | Sept. 30, 1947 |

FOREIGN PATENTS

| Number | Country | Date |
|---|---|---|
| 476,990 | Great Britain | Dec. 20, 1937 |